(12) United States Patent
Anderson

(10) Patent No.: US 6,622,087 B2
(45) Date of Patent: Sep. 16, 2003

(54) METHOD AND APPARATUS FOR DERIVING TRAVEL PROFILES

(75) Inventor: Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 09/748,813

(22) Filed: Dec. 26, 2000

(65) Prior Publication Data

US 2002/0082771 A1 Jun. 27, 2002

(51) Int. Cl.[7] .............................................. G01C 21/00
(52) U.S. Cl. .................... 701/209; 701/201; 701/117
(58) Field of Search ............................... 701/117, 118, 701/119, 201, 204, 208, 209; 340/988, 990, 995; 73/178 T; 342/375.01

(56) References Cited

U.S. PATENT DOCUMENTS

| | | | |
|---|---|---|---|
| 5,568,390 A | * | 10/1996 | Hirota et al. ............... 364/449 |
| 5,717,923 A | | 2/1998 | Dedrick |
| 5,874,905 A | | 2/1999 | Nanba et al. |
| 5,919,245 A | | 7/1999 | Nomura |
| 5,919,246 A | | 7/1999 | Waizmann et al. |
| 5,933,100 A | | 8/1999 | Golding |
| 5,936,631 A | | 8/1999 | Yano et al. |
| 6,088,648 A | | 7/2000 | Shah et al. |
| 6,161,071 A | * | 12/2000 | Shuman et al. ............... 701/48 |
| 6,292,743 B1 | * | 9/2001 | Pu et al. ..................... 701/202 |

FOREIGN PATENT DOCUMENTS

DE 19535576 A1 4/1996

\* cited by examiner

Primary Examiner—Yonel Beaulieu
(74) Attorney, Agent, or Firm—Blakley, Sokoloff, Taylor & Zafman LLP

(57) ABSTRACT

A route request is received from a user to travel from a start location to a destination location. A route guidance is provided for a route to the destination location based on a travel profile for the user in response to the route request. The travel profile comprises one or more of a history of driving behavior of the user and a driving preference specified by the user.

37 Claims, 7 Drawing Sheets

METHOD AND APPARATUS FOR DERIVING TRAVEL PROFILES

FIELD OF THE INVENTION

The present invention relates generally to field of vehicle navigation systems. More specifically, the present invention is directed to a method of providing routing assistance based on travel profiles.

BACKGROUND OF THE INVENTION

Technological advances in sensing technology, coupled with recent political moves (the decision to unscramble GPS information, and the mandate for cell phone location support for 911), are leading to a state in which high quality location information for an individual or automobile can be easily tracked in real time. Information of higher quality is currently available from automotive systems, which typically rely on additional accelerometers, and additional sensors to more accurately track the vehicle's movements.

With a global positioning system (GPS) satellite, different on-board vehicle navigation systems are made available to provide drivers with directional information such as, for example, routes and street maps. A position sensor together with a map database can be used to identify the position of the vehicle as well as the traveling direction of the vehicle. The vehicle navigation systems may compute a shortest route to take the driver from a source location to a destination location.

Automobile navigation systems like the one described above may use a technique known as "dead reckoning" to estimate the position of the vehicle as the vehicle travels. In dead reckoning, the heading of the vehicle and the distance traveled from a previously calculated position are first determined based on data received from on-board sensors (e.g., compass and odometer). A new position of the vehicle is then estimated by applying the measured parameters to well-known equations. Dead reckoning is subject to certain sources of error, however, which accumulate as the vehicle travels. Therefore, the estimated position of the vehicle is periodically compared to the street map database and adjusted to correct for such error. The map database is a key component to the reliability of the navigation system. The map database has to be accurate and up-to-date for a system to work properly. The map database usually comes on CD-ROM or DVD.

The navigation system and the map database together generally provide detailed driving information for most of the major metropolitan areas. The driving information however is not geared to any particular driver. Two drivers in two different vehicles going from the same source to the same destination may receive the same driving information from two similar navigation systems. This makes the navigation system not user friendly as each driver may have different preferences. It would be advantageous to customize the navigation system for each user.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1A:
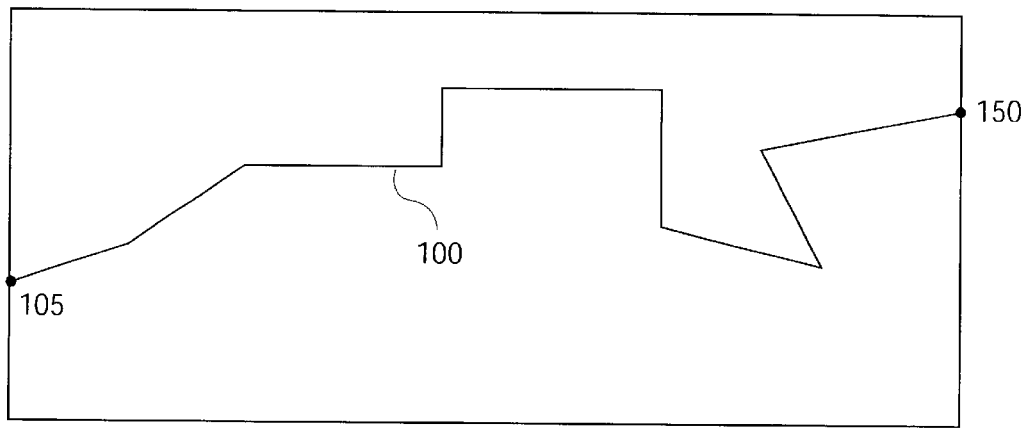
FIG. 1A is an exemplary diagram illustrating a route.

A method for providing routing assistance to a user based on a user's travel profile is disclosed. The travel profile comprises information that can be used to provide customized route guidance to the user. The travel profile may comprise an aggregate of driving history collected over a period of time. This may include the user's driving style, likes and dislikes, as well as information about areas frequented by the user, or areas and driving features that the user wants to avoid. The travel profile may also comprise preferences specified by the user. The travel profile together with travel condition information such as, for example, weather condition, traffic condition, etc., are used to enhance the user s travel experience.

In the following discussion, the term "trip" is used to refer to a set of "travel steps" for a user to take to get the user from a starting point to a destination point. The term "route" is used to refer to a specific set of travel steps or "route segments" for the user to take to complete the trip. The term "route segment" is used to refer to an atomic segment in the map database.

In one embodiment, the user travel profile is established by tracking the user's location information over a period of time. The user travel profile may not be as accurate at the beginning because the information collected may be insufficient. In this situation, the user may need to enter travel preferences to help improve the accuracy of the user travel profile. However, as more data is collected over time, the user travel profile may become more accurate and the efficiency of the routing assistance would improve. The user travel profile may include a network of roadways or transportation network established based on routes that the user travels over the same period of time. For example, the transportation network may indicate that on weekdays the user normally drives to a downtown area in the morning, to west of the city during lunch time, and to north of the city in the evening..

Furthermore, the transportation network may indicate that the user always drives, for example, around $24^{th}$ street in the evening whereas driving through $24^{th}$ street would have been faster. In one embodiment, based on this behavior and similar behaviors by the user and based on crime information or other information collected for the area around $24^{th}$ street, it is determined that the user feels this area is not a safe or desirable area. As such, route guidance provided to this user may need to circumvent undesirable areas. Note that other users may not feel as intimidated about the $24^{th}$ street as the user in the above example. Correspondingly, using the above example, the route guidance for these users would be based on the route directly through $24^{th}$ street.

Note that the user may also avoid 24$^{th}$ street only at specific times of day, or in correlation with other events in the area, for example a basketball game at an arena on 24$^{th}$ street.

In one embodiment, a route is recommended to the user based on utility metrics. The utility metrics may comprise fuel, time, familiarity, etc. The recommended route may be a route that is most efficient in terms of the utility metrics. When the user persistently takes a different route by ignoring the recommended route or by explicitly rejecting the recommended route, the route guidance system would recognize that the user prefers this different route to the recommended route. This recognition may also be inferred from the user's driving patterns. In one embodiment, the navigation system may request feedback from the user to determine, confirm or hypothesize the cause why the user takes a different route from the recommended route.

The user travel profile may also comprise information directly entered by the user. For example, the user may indicate that the user would rather make right turns instead of left turns in front of on-coming traffic. Other preferences specified by the user may include driving speed, scenic routes over downtown routes, etc. The user travel profile may be used to guide the user using routes that the user feels comfortable with while the travel conditions may be used to dynamically steer the user from one route to another route while maintaining as much consistency as possible with the user travel profile.

In one embodiment, the user is equipped with a navigational system and a position sensor coupled with a GPS (global positioning system) satellite. The navigational system is coupled with a map database to provide routing assistance. It would be apparent to one skilled in the art that the navigational system may also include other components such as, for example, a display device, input device, memory, etc. The navigational system may provide a primary route to the user when a destination is specified. The primary route is a route calculated by the navigation system based on the current travel conditions and based on the user travel profile.

In one embodiment, the destination may be inferred from the user travel profile. As discussed above, the user travel profile comprises a history of the user s driving patterns including source, destination, and route information for previous trips. Past route segments traversed, current time, and location information may be used to determine a destination intended by the user. For example, the navigation system may be able to determine that when the user left home at 7:30 A.M. and started down the route to work, the user's work place is the destination. The probability of determining the correct destination increases as the user travels further down the route. When the probability is low (e.g., at the early part of the route), the navigation system may monitor multiple possible routes from the current location of the user. The number of possible routes decreases as the number of route segments for the current trip increase, and as such a possible destination becomes more likely as a correct destination.

Figure 1B:
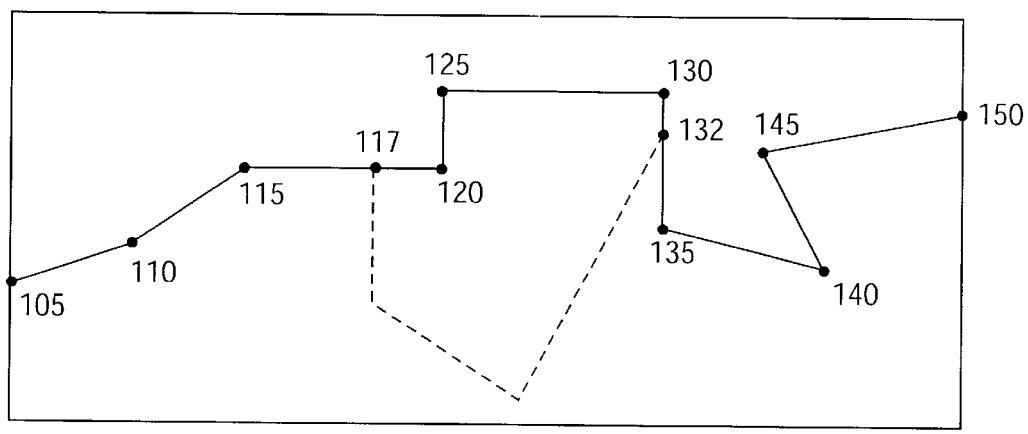
FIG. 1B is an exemplary diagram illustrating multiple route segments.

FIG. 1A is an exemplary diagram illustrating a route. Route 100 is from a source location 105 to a destination location 150. The route 100 may be comprised of multiple route segments. FIG. 1B is an exemplary diagram illustrating multiple route segments. Generally, the route 100 and its segments 105–110, 110–115, 115–120, 120–125, 125–130, 130–135, 135–140, 140–145, 145–150 remain the same as the user travel from the source location 105 to the destination 150.

As the user travels on any route segment from the source location 105 to the destination 150, the user may encounter different travel conditions that may affect the user's travel experience. Changes to the travel conditions may include, for example, a change to traffic conditions, change of weather causing dangerous road conditions, special events causing road closure, etc. The change to traffic conditions may comprise one or more of a traffic jam, a traffic accident, and other traffic related incidents. For example, at a time when the user travels on the route segment 120–125, there may be a parade about to start on the route segment 125–130 and traffic through this route is to be delayed for at least two hours. The user may be in a hurry and thus wishes that the user knew about the parade prior to going down the route segment 120–125. Had the user known about the parade, the user would have taken an alternate route segment 117–132 represented by the dotted line to bypass the parade. Although the route segment 117–132 is longer, it may get the user to the destination 150 faster under the circumstance.

In one embodiment, the navigation system comprises a dynamic routing agent. The dynamic routing agent may dynamically direct the user from the primary route to an alternate route when there are changes to travel conditions that may affect using the primary route. In one embodiment, as the user travels, the dynamic routing agent continuously monitors the different travel conditions as they apply to the route segments that the user is approaching. The dynamic routing agent monitors the different travel conditions by receiving live feed information and screens or filters the information according to the route segment to be traveled by the user. The dynamic routing agent may also receive delayed feed information in addition to the live feed information.

Figure 2:
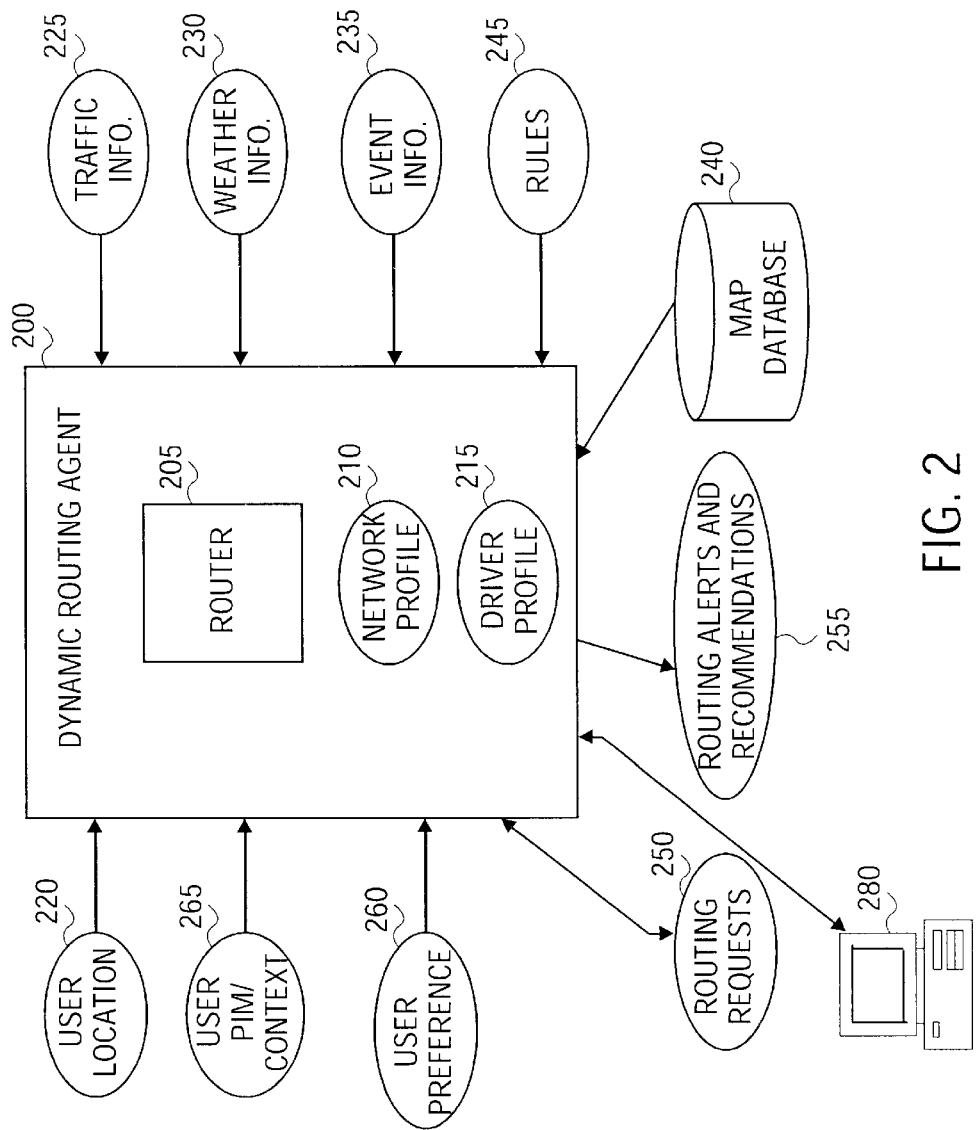
FIG. 2 is an exemplary illustration of a dynamic routing agent.

FIG. 2 is an exemplary illustration of one embodiment of the dynamic routing agent. The dynamic routing agent 200 comprises a router 205, a network profile 210 and a driver profile 215. The user personal information manager (PIM) 265 provides information that can be used in identifying routes to monitor for proactive notification. The network profile 210 may be a time-indexed profile, which would indicate an expected travel time given a start time. As discussed in the example above, when the user leaves home at around 7:30 A.M. for work, the dynamic routing agent 200 recognizes based on the user travel profile that the user is heading for work and provides the expected travel time. The travel time for the same route may not be the same each time due to happenings of events. There may be multiple network profiles 210 based on changes to travel conditions or based on the occurrence of events that may delay the expected travel time. The driver profile 215 contains the user driving characteristics. For example, the user driving characteristics may contain information on the speeds that a user drives relative to the speed limit or flow of traffic. The dynamic routing agent 200 receives information from various input sources. For example, the user location 220 is sent to the dynamic routing agent 200 in real time using a global positioning system (GPS). Similarly, traffic information 225 and weather information 230 may be provided by live feed to the dynamic routing agent 200. Furthermore, local event information 235 such as, for example, a sporting event time in a downtown stadium may also be provided to the dynamic routing agent 200.

The map database 240 contains necessary information for mapping location points to route segments. The map database 240 comprises a route segment database. The map database 240 may also comprise information about traffic controls such as, for example, signal, speed limits, road types, points of interest, etc. The rules 245 are heuristics, which can be applied to improve safety, efficiency, etc such as, for example, re-routing away from steep grades during freezing condition, etc. The user location 220 may provide user identification, a timestamp when the location was sensed, and location tuples (e.g. latitude, longitude) to the dynamic routing agent 200. The user location 220 may also provide additional data such as direction of travel, velocity, etc. The router 205 is a mechanism that retrieves information from the map database 240 and applies the network profile 210 and the driver profile 215 to determine routes and their characteristics at a certain time.

In addition to establishing the user travel profile based on the user's driving behavior over a period of time, the dynamic routing agent 200 also allows the user to directly enter the user preferences 260. For example, the user may use a personal computer 280 to enter the user's driving preferences using the user identification. The personal computer 280 may communicate with the dynamic routing agent 200 using a network connection such as, for example, an Internet connection. In addition, the user may also use the personal computer 280 to select rules from a set of rules 245 and prioritize them according to the user's preference. The personal computer 280 may also be used to register a new user to the dynamic routing system.

Typically, the dynamic routing agent 200 receives route requests 250 in the form of start and destination points. A route is determined based on the start and destination points. The dynamic routing agent 200 uses the route to map against the traffic information 225, the weather information 230, the event information 235, the rules 245, the user profiles 215, etc. When the dynamic routing agent 200 determines that the route needs to be changed because of a problem affecting the route, an alternate route is suggested to the user. A description of the problem and directions to the alternate route may be sent using the routing alerts and recommendation connection 255.

Alternatively, the dynamic routing agent 200 may recognize that the user is awared of the alternate route based on the user travel profile. In this case, the dynamic routing agent 200 may simply alert the user information about the event that requires the user to re-route to the alternate route. For example, the dynamic routing agent 200 may alert the user that a traffic jam exists on highway 26. In one embodiment, the routing requests 250 and the routing alerts and recommendation 255 are sent using wireless communication.

Although not shown in FIG. 2, feedback from external sources (e.g., a phone company's aggregate data for many users), may be used to supply data to the route segment database (in the map database 240) or to the network profile 210. The dynamic routing agent 200 enables routing that will be most efficient and comfortable for the user. Familiar routes are safer, since they reduce the distractions of dealing with new surroundings. The dynamic routing agent 200 also improves estimates of trip durations and provides most efficient times and routes for given trips to help with more efficient scheduling.

In some situations, there may be delay in providing the live feed travel conditions to the dynamic routing agent 200. For example, a traffic accident that just happened probably would not be reported by the highway patrol immediately. However, the traffic accident would immediately cause traffic to slow down. In one embodiment, the dynamic routing agent 200 provides the ability to apply current traffic conditions sensed from others to dynamically reroute the user. By continuously tracking the vehicles equipped with the system in this invention, the dynamic routing agent 200 can analyze the information provided by the position sensors from these vehicles. For example, when the position information received by the dynamic routing agent 200 indicate that these vehicles are moving slower than an expected speed for that particular route segment, the slow speed may be caused by a travel condition. This traffic delay condition can then be applied to the user who is about to use the same route segment. The alternate route segment may then be suggested to avoid the delay.

Using the dynamic routing agent 200, more accurate trip-time estimates based on the user travel profile and the current travel condition can be provided. For example, when the user travel profile indicates that the user has a tendency to drive 70 mph on a highway route segment having a posted speed limit of 55 mph, the estimated travel time would be shorter as compared to a user who complies with the posted speed limit.

Figure 3:
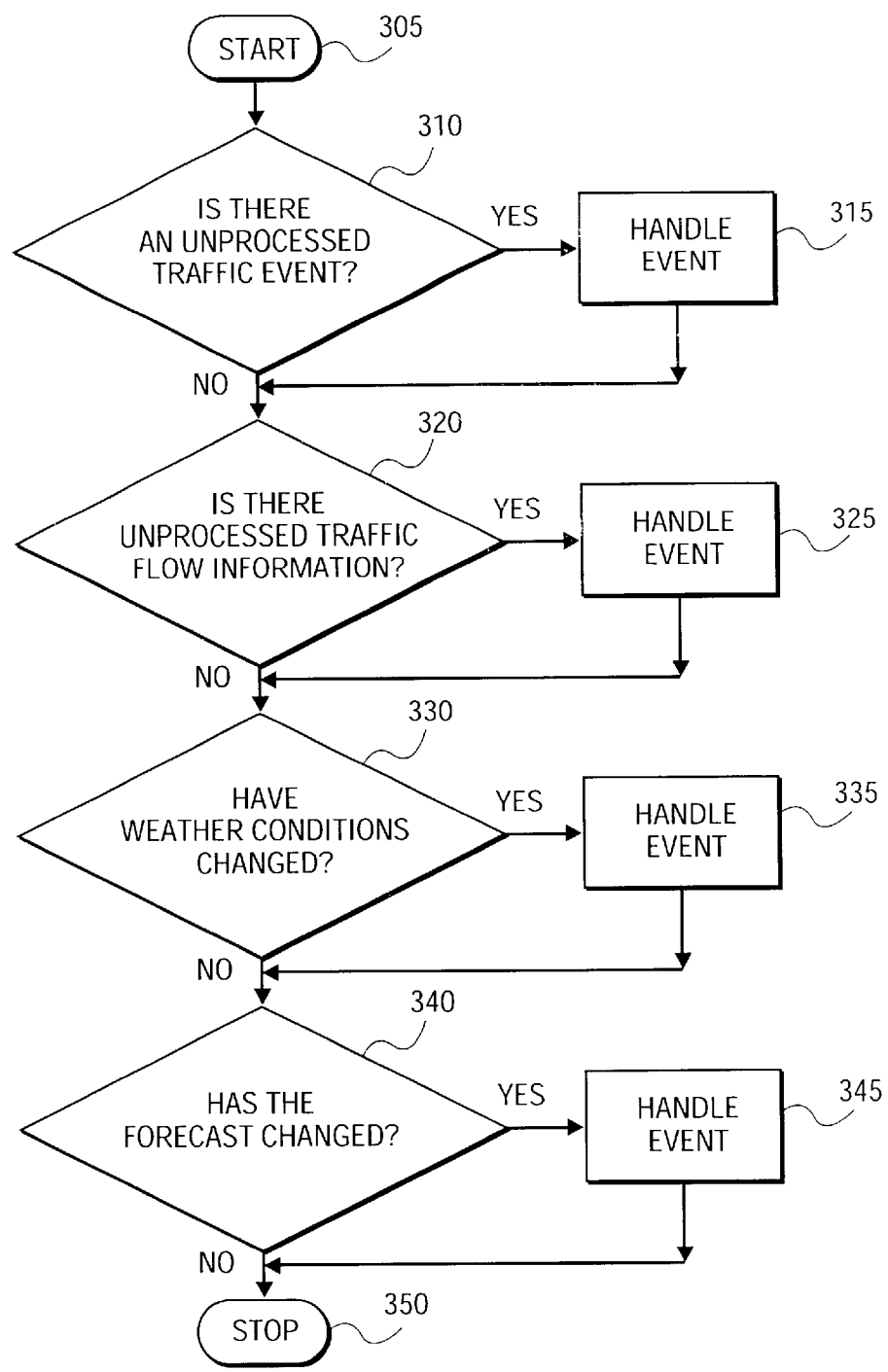
FIG. 3 is an exemplary flow diagram illustrating a process of events handling.

FIG. 3 is an exemplary flow diagram illustrating one embodiment of a process of event handling. The dynamic routing agent 200 receives different feed information (e.g., traffic information, weather information and etc). The feed information is also referred to as travel condition information. The feed information may be received in real time. Alternatively, some of the feed information may be based on forecast (i.e., non-real time) or based on delayed information. The dynamic routing agent 200 receives the primary route from the navigation system. The primary route comprises multiple route segments to be taken by the user to complete a trip. The dynamic routing agent 200 filters the feed information to match with each route segment. For example, when there is an accident on a route segment, this information will be relevant if it occurred on or impacts the same route segments that the user is about to travel on. The process in FIG. 3 starts at block 305 for a particular route segment. At any one time, there may be multiple traffic events relevant to the particular route segment that the user is approaching. In that situation, all of the traffic events have to be processed in order to provide more accurate route assistance to the user. For example, a first traffic event for a route segment may be a minor fender bender, which barely delays the traffic. However, a second traffic event for the same route segment may be an overturn of a diesel truck. The second traffic event may require road blockage and detour. Both of these events need to be considered for the route assistance to be of value to the user. Note that multiple events or conditions must be applied to the route as a whole, even if they impact different route segments.

At block 310, a determination is made to see if there is an unprocessed traffic event. When the result is "yes", the process moves to block 315 where the unprocessed traffic event is handled. The process continues at block 320 where a determination is made to see if there is unprocessed traffic flow information. For example, traffic on a route segment may be slower on a day after a holiday than any other days. If the result is "yes", the process moves to block 325 where the unprocessed traffic flow is handled. The user may be interested in being advised of the traffic flow information when the user is in a hurry. The dynamic routing agent 200 may use the traffic flow information to provide the user a better estimate of travel time.

The process continues at block 330 where a determination is made to see if the weather conditions have changed. When the result is "yes", the process moves to block 335 where the change in the weather condition is handled. For example, the change in the weather condition may cause the estimated travel time to be longer if the weather causes the traffic to slow down. The change in the weather condition may also cause the dynamic routing agent 200 to suggest an alternate route if the weather condition causes the route segment to be closed. The process continues at block 340 where a determination is made to see if the forecast has changed. If the result is "yes", the process moves to block 345 where the change is forecast event is handled. For example, the change in forecast may indicate that an expected storm warning over an area has now been removed due to a shift in wind direction. Based on this, the dynamic routing agent 200 may suggest a shorter alternative route segment going through the area instead of a route segment going around the area. The process ends at block 350. It would be apparent to one skilled in the art that the events illustrated in FIG. 3 are for exemplary purposes only, and that there may be other events such as, for example, a sporting event, a mud slide, etc., that the dynamic routing agent 200 needs to handle to assist the user.

Figure 4:
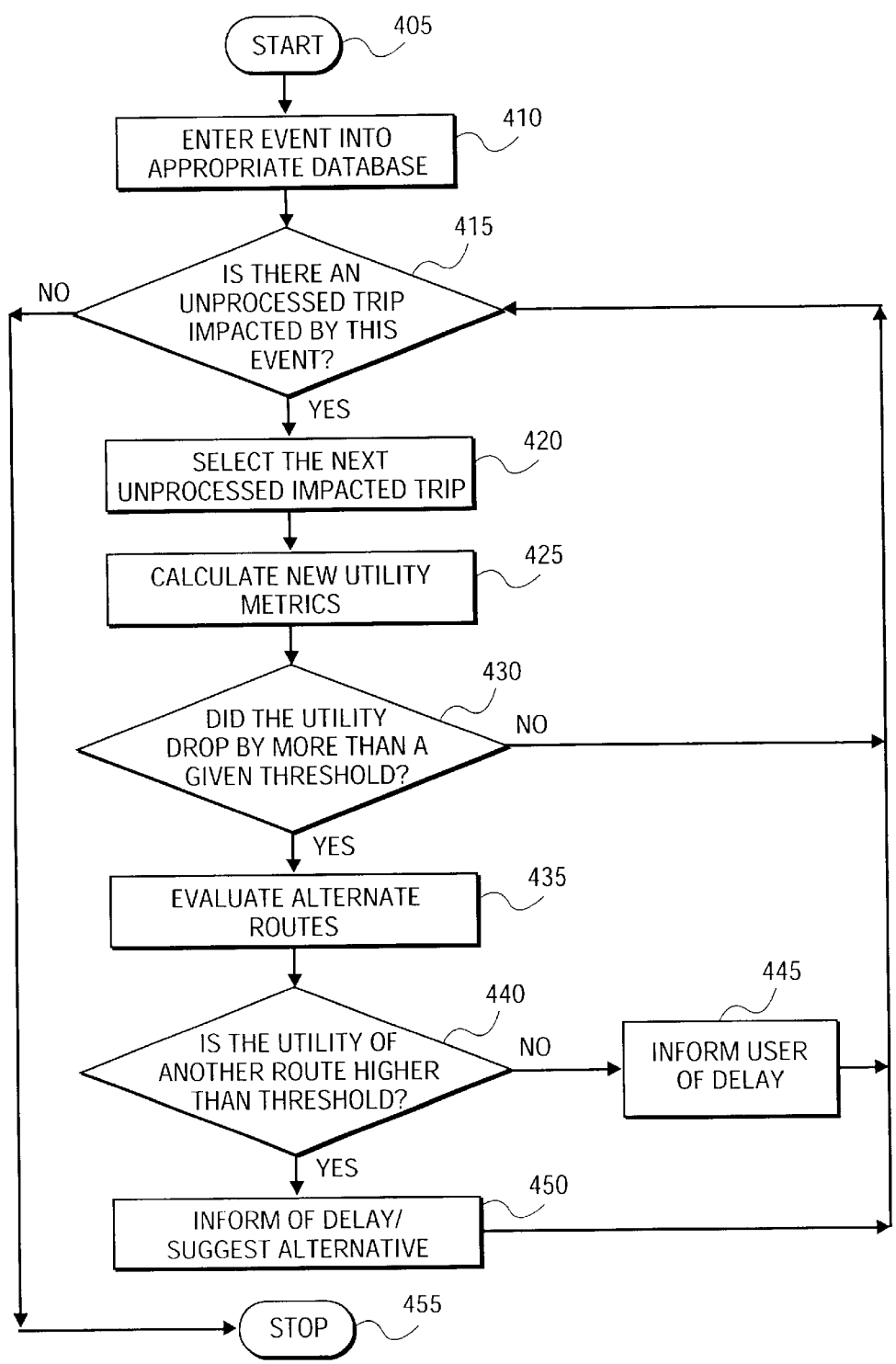
FIG. 4 is an exemplary flow diagram illustrating one event handling process.

FIG. 4 is an exemplary flow diagram illustrating one event handling process. The process starts at block 405. In one embodiment, when an event occurs, information about the event is entered by category into a database, as shown at block 410. The information may include, for example, the type of event and the area the event occurs. Note that an event may also be a removal of an existing travel condition. For example, the event may be a resumption of a route from its blocked status due to a prior weather condition.

Each event may be associated with a weight, which reflects a traffic cost. For example, a light snow condition may require the traffic to reduce the speed on a highway from 55 miles per hour to 30 miles per hour. However, a heavy snow condition on the same highway may cause the traffic to slow down to 5 miles per hour or less. The event weight for a particular route segment is then used to assist the user with travel time estimates and/or with route guidance.

At block 415, the dynamic routing agent 200 determines if there is an unprocessed trip impacted by the event. As discussed above, a trip comprises one or more travel steps or route segments for a user to move from a starting point to a destination. Note that the event may affect one or more trips taken by the user where the one or more trips require the user to use the same route segments impacted by the event. Furthermore, the event may also affect trips taken by multiple other users using the same route segments impacted by the event. For example, a traffic accident event that occurs near the user's work place affects both a trip the user takes from the user's home to the user's work place and a trip the user takes from the user's work place to an airport.

If the event does not affect any other trip, the process ends at block 455. From block 415, if there is a trip impacted by the event, the process moves to block 420 where a next unprocessed trip is selected. At block 425, new utility metrics are calculated. The utility metrics may comprise fuel, time, etc. The utility metrics may also comprise a level of comfort desired by the user.

At block 430, a determination is made to see how the utility metric calculated in block 425 deviates from an original utility metrics. For example, when the estimated travel time indicates that the user will arrive at a destination location at 3:00 p.m. and when the user indicates that the user needs to be at the destination location no later than 3:30 p.m. (i.e., 30 minutes threshold), the dynamic routing agent 200 needs to evaluate the weight associated with the event and the threshold. If the event only causes a five minutes delay, then the dynamic routing agent 200 may maintain the same route. In this case, the event may be ignored for the selected trip and the process moves from block 430 to block 415 to see if the same event may impact another trip.

However, from block 430, when the event causes a delay more than the given threshold, then the dynamic agent 200 attempts to calculate an alternate route, as show in block 435. For example, the event may cause a traffic delay such that the user would not be able to arrive at the destination before 3:30 p.m. At block 440, a determination is made to see if the alternate route is within the threshold indicated by the user. For example, the alternate route may be longer but it may allow the user to arrive at the destination before 3:30 p.m. In this case, the alternate route is within the threshold and the process moves to block 445. Block 445 informs the user of the delay causes by the event. Block 445 may also inform the user that the alternate route is suggested and that the user will arrive at the destination within the threshold by using the alternate route. From block 455, the process moves back to block 415 to see if there are any other trips impacted by the event that have not been processed.

Going back to block 440, when the alternate route causes the travel time to be beyond the threshold, as in the above example, the process moves to block 450 where the user is notified about the alternate route. In one embodiment, the user may need to confirm the suggested alternate route or reject the alternate route and stays with the original or primary route. Note that the actions the user takes will provide positive feedback as to whether the route was accepted or rejected. From block 450, the process moves back to block 415 to see if there is any other trips impacted by the event that have not been processed.

As discussed above, the happening of an event may be a removal of an existing travel condition such as, for example, the removal of a roadblock. In one embodiment, when the user confirms and accepts the suggested alternate route discussed in block 450 in FIG. 4, the dynamic routing agent may provide better alternate routes. The better alternate routes may become available due to subsequent changes in the travel conditions. For example, the suggested alternate route may be the only route available to take the user to the destination. However, the suggested alternate route may carry a high cost such as, for example, being excessively long. As such, the dynamic routing agent periodically or continuously applying the user location and the travel condition information to find a better alternate route to get to the same destination.

Figure 5:
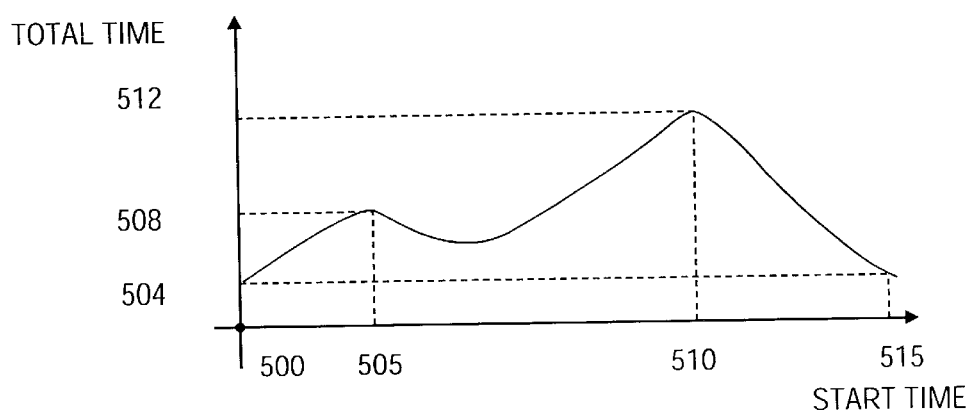
FIG. 5 is an exemplary graph illustrating a route travel time based on different route start time.

FIG. 5 is an exemplary graph illustrating a route travel time based on different route start time. The graph includes four different start times 500, 505, 510, 515 to travel from a source location to a destination location. Note that when the user starts the route at time 500 or at time 515, the travel time 504 is the same. The travel time 508 is longer when the user starts the route at time 505, and the travel time 512 is longest when the user starts the route at time 510. For example, the travel time may be shortest early in the morning at time 500 or late in the evening at time 515 where there is no commute traffic. The travel time may be longest in the early evening at time 510 when the roadways are congested with commute traffic.

In one embodiment, the dynamic routing agent 200 suggests to the user a route plan when the user needs to travel to multiple destinations in a certain time period. The route plan allows the user to efficiently arrive at each destination. For example, the dynamic routing agent 200 may take the different potential travel times to the destinations and the relative locations of each destination to suggest the travel plan that takes the shortest time and require the least overall travel distance. In another embodiment, the different destinations are communicated with the dynamic routing agent 200 automatically. For example, the user may use a personal planner such as, for example, a personal digital assistant (PDA), a personal information manager (PIM) to indicate the different destinations that the user needs to be at within a certain time constraint (e.g., during lunch time). The personal planner may then communicate this information using a communication connection such as, for example, wireless communication, to the dynamic routing agent 200. The dynamic routing agent 200 then suggests a travel route taking into consideration the user profile and the different travel conditions (e.g., travel time, distance, traffic condition, etc.).

Figure 6:
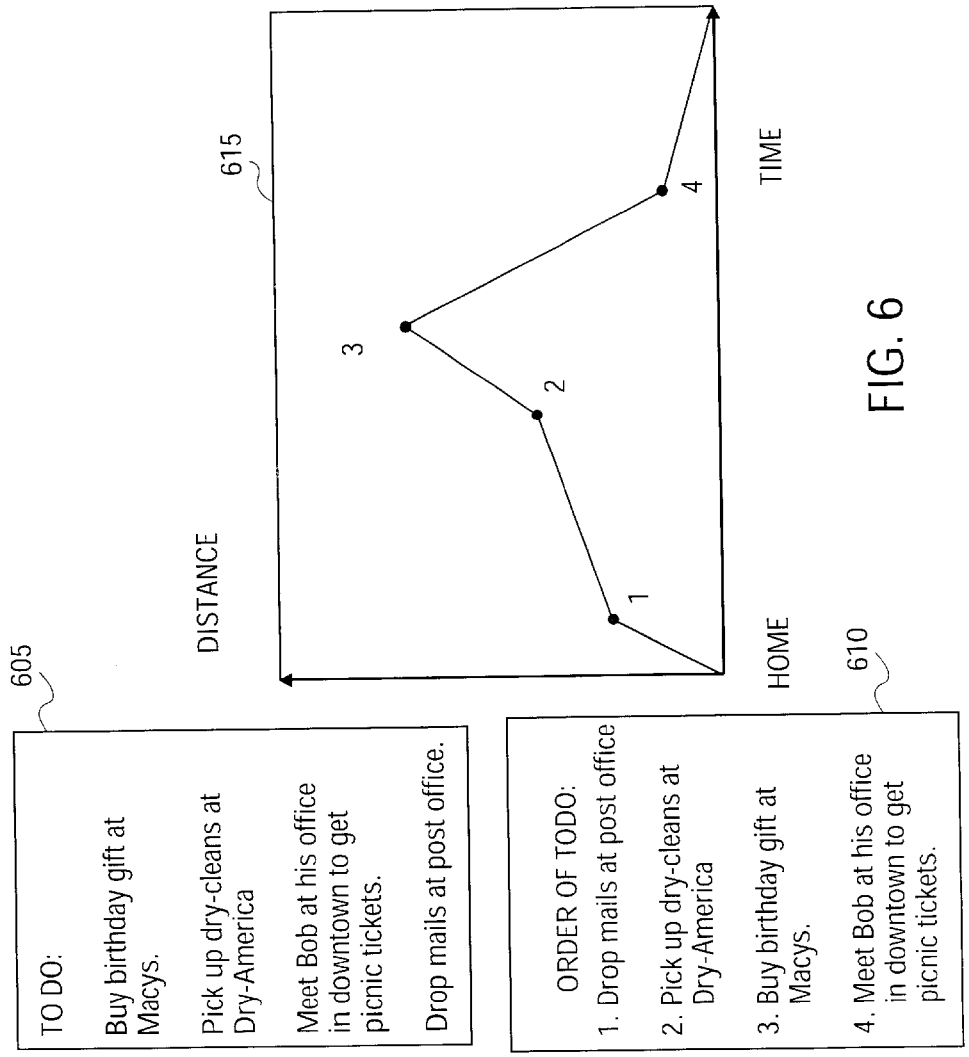
FIG. 6 is an exemplary route planning based on multiple activities.

FIG. 6 is an exemplary route planning based on multiple destinations. Block 605 illustrates an exemplary list of four tasks that the user has entered into the personal planner. The four tasks require the user to travel to four different destinations. The user may specify a travel objective such as, for example, the dry-cleaning has to be picked up before meeting Bob at his office. The dynamic routing agent 200 uses this information and calculates a route that allows the user to efficiently arrive at all four destinations. This may require rearranging the order of the tasks shown in block 605. Block 610 is an exemplary order of tasks as suggested by the dynamic routing agent 200. Block 615 is an exemplary chart illustrating the route for the user to travel to accomplish each of the tasks 1, 2, 3 and 4 shown in block 610. The chart illustrated in block 615 may be the most efficient route (i.e., a route with the lowest cost) for the user to travel considering the time constraint that the user needs to accomplish the four tasks.

In one embodiment, the dynamic routing agent may suggest an optimal time for making a trip and/or an anticipated travel time for making the trip to help with planning purpose. For example, when the user specifies that the user needs to be in an accountant's office in a downtown location sometimes during the coming week, the dynamic routing agent suggests an optimal day and time that the user can make the trip to the downtown location. Alternatively, if the user specifies a particular day and time that the user wants to be at a certain destination (e.g., appointment at a downtown location at 10:30 A.M. on Thursday), the dynamic routing agent provides the user information about the expected travel time. This information about the expected travel time is provided based on the network profile for the route to the destination, the user's diving profile, and the event information that affect the route to the destination. Note that this expected travel time may be affected by events that happen subsequently.

Figure 7:
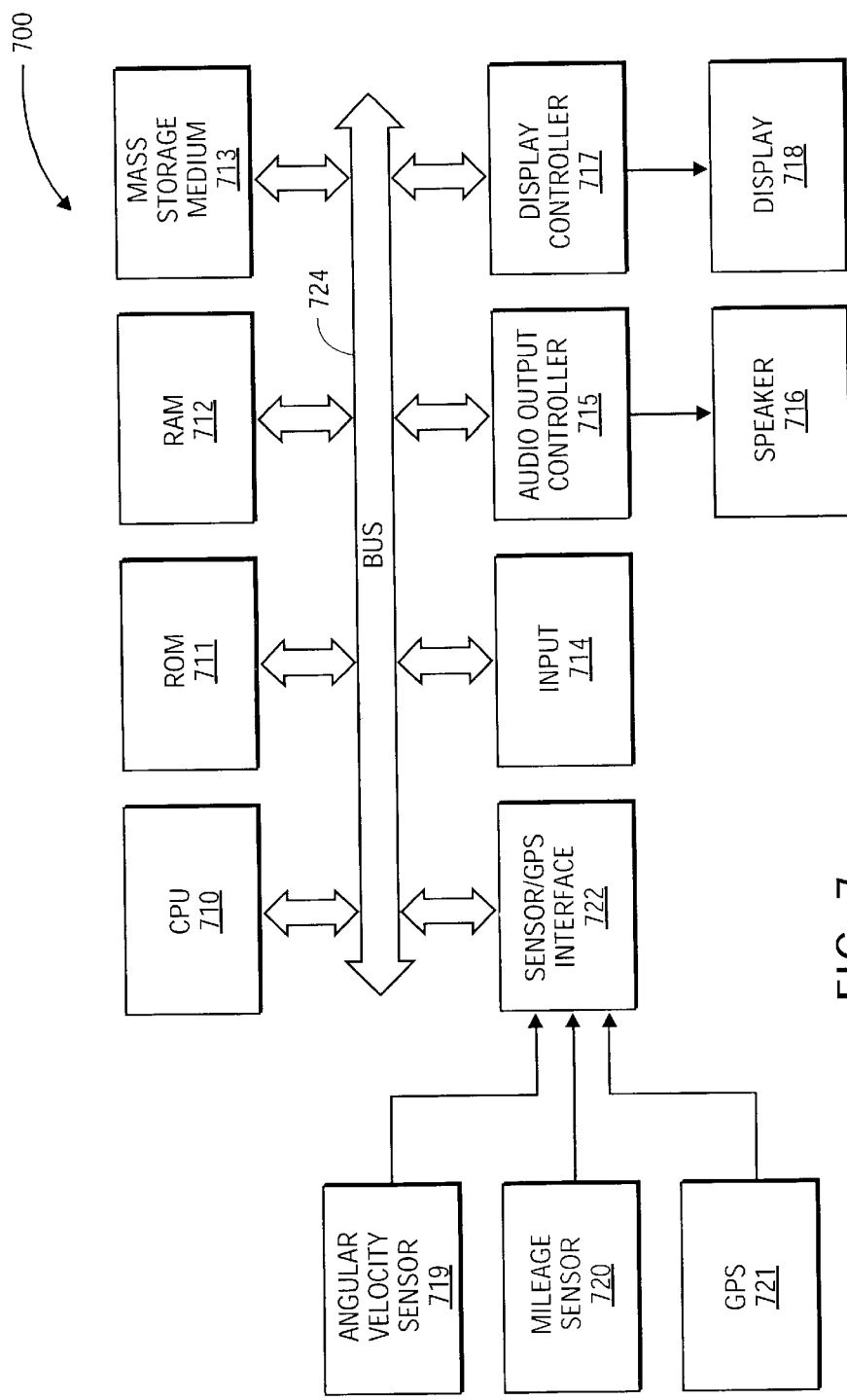
FIG. 7 is an exemplary navigation system, in which the present invention can be implemented.

FIG. 7 illustrates a navigation system, in which the present invention can be implemented. Generally, the system 700 provides a visual display of a street map of a geographic area and an indication of the position and movement of the vehicle. In response to the user's inputting a desired destination, the system computes a best route from a starting location to the destination and then provides navigation instructions to the user to guide the user to the destination. In one embodiment, the user selects the destination from a list of possible destinations provided by the system 700. The navigation instructions are provided in the form of digitized or synthesized speech. The instructions can also be provided visually in an alternate display mode, in which the next maneuver is indicated in the form of an arrow symbol and/or text.

The system 700 includes a central processing unit (CPU) 710, read-only memory (ROM) 711, random access memory (RAM) 712, and a mass storage medium 713, all coupled together by a bus 724. The CPU 710 controls operation of the system 700 by executing instructions stored in ROM 711, RAM 712, or both. For example, instructions stored in ROM 711 may be copied to RAM 712 for execution by the CPU 710. RAM 712 may include static RAM (SRAM), which receives power from the vehicle's battery to maintain its stored data when the vehicle's engine is off. ROM 711 is non-volatile memory, some or all of which may be erasable and/or re-programmable. For example, ROM 711 may be flash memory, electrically erasable programmable ROM (EEPROM), or any other suitable form of programmable-erasable non-volatile memory. Mass storage medium 713 may comprise a magnetic, optical, or other form of non-volatile storage device suitable for storing large quantities of data.

The system 700 also includes several sensors 719, 720, and 721 to provide data for purposes of dead reckoning. In particular, the system 700 includes an angular velocity sensor 719, a mileage sensor (e.g., an odometer) 720, and a Global Positioning System (GPS) locator 721. Each of sensors 719–721 is coupled to an interface 722, which is coupled to the bus 724. Interface 722 includes various circuitries for interfacing sensors 719–721 to the bus 724, such as analog-to-digital converters. The system 700 also includes an input unit 714 that is coupled to the bus 724. The input unit 714 includes various controls such as buttons (which may be mechanical in nature) by which the user can enter commands and data into the system 700, such as when selecting a destination or various output options. The system 700 outputs digitized or synthesized audio navigation instructions to the user via a speaker 716. The speaker 716 is coupled to the bus 724 via an audio output controller 715. A visual display is provided to the user via a display device 718 that is coupled to the bus 724 by a display controller 717. The display device 718 may be a liquid crystal display (LCD), a cathode ray tube (CRT), or any other suitable form of display device.

The system 700 uses "dead reckoning" in combination with a map-matching algorithm to accurately determine the position of the vehicle on roads of a street map. The street map is provided by a stored map database. Mass storage medium 713 stores the map database containing streets. Operation of the navigation system, including communication with the dynamic routing agent 200 illustrated in FIG. 2, may be an implemented using software, e.g., by instructions stored in ROM 711, RAM 712, or mass storage device 713 (or a combination thereof) and executed by CPU 710. Alternatively, certain operations, including the communication with the dynamic routing agent 200, may be implemented using only hardwired circuitry.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method, comprising:
   receiving a route request to travel from a start location to a destination location; and
   providing a route guidance for a first route to the destination location based on a user travel profile in response to the route request, wherein the user travel profile comprises one or more of a history of driving behavior of a user tracked over a period of time and a driving preference specified by the user, wherein when the first route is affected by travel condition information, a second route is suggested along with an estimated travel time to the destination using the second ,route.

2. The method of claim 1, wherein providing the route guidance comprises:
   receiving the travel condition information, and
   applying the travel condition information to the first route or to the second route.

3. The method of claim 2, wherein applying the travel condition information comprises selecting the travel condition information relevant to the first route or to the second route.

4. The method of claim 1, wherein the travel condition information is received from one or more feeds, each of the feeds being one of real time, forecast and delay.

5. The method of claim 3, wherein the travel condition information comprises one or more of a weather condition, a traffic condition and an event, wherein the traffic condition comprises one or more of a traffic jam and a traffic accident.

6. The method of claim 2, wherein when the travel condition information affects the first route or the second route as determined based on a threshold, an alert is generated.

7. The method of claim 1, further comprising receiving a desired arrival time at the destination location, wherein the desired arrival time is used to provide the route guidance.

8. A method, comprising:
   establishing a user travel profile for a user, the user travel profile including one or more of driving behaviors of the user tracked over a period of time and driving preference received from the user;
   receiving travel condition information for an area to be traveled by the user;
   receiving a list of tasks to be performed by the user within a time constraint, the list of tasks comprising one or more tasks, each of the one or more tasks to be performed at a different location; and
   providing a plan to perform the one or more tasks within the time constraint using the user travel profile and the travel condition information.

9. The method of claim 8, wherein the one or more tasks are specified in a personal information manager (PIM).

10. The method of claim 8, wherein providing the plan to perform the one or more tasks comprises arranging the one or more tasks in an order to allow the one or more tasks to be performed within the time constraint.

11. The method of claim 10, further comprises providing a route guidance to perform the one or more tasks at a lowest cost.

12. The method of claim 8, wherein receiving travel condition information comprises receiving one or more from a group comprising weather information, traffic information and event information.

13. A computer readable medium having stored thereon sequences of instructions which are executable by a digital processing system, and which, when executed by the digital processing system, cause the system to perform operations comprising:
   receiving a route request to travel from a start location to a destination location; and
   providing a route guidance for a first route to the destination location based on a user travel profile in response to the route request, wherein the user travel profile comprises one or more of a history of driving behavior of a user tracked over a period of time and a driving preference specified by the user,
   wherein when the first route is affected by travel condition information, a second route is suggested along with an estimated travel time to the destination using the second route.

14. The computer readable medium of claim 13, wherein providing the route guidance comprises:
   receiving the travel condition information, and
   applying the travel condition information to the first route or to the second route.

15. The computer readable medium of claim 14, wherein applying the travel condition information comprises selecting the travel condition information relevant to the first route or to the second route.

16. The computer readable medium of claim 13, wherein the travel condition information is received from one or more feeds, each of the feeds being one of real time, forecast and delay.

17. The computer readable medium of claim 15, wherein the travel condition information comprises one or more of a weather condition, a traffic condition and an event, wherein the traffic condition comprises one or more of a traffic jam and a traffic accident.

18. The computer readable medium of claim 14, wherein when the travel condition information affects the first route or the second route as determined based on a threshold, an alert is generated.

19. The computer readable medium of claim 13, further comprising receiving a desired arrival time at the destination location, wherein the desired arrival time is used to provide the route guidance.

20. A navigation system, comprising:
   a map database; and
   a processor coupled to the map database, the processor operable to:
   receive a route request to travel from a start location to a destination location; and
   provide a route guidance for a first route to the destination location based on a user travel profile in response to the route request, wherein the user travel profile comprises one or more of a history of driving behavior of a user tracked over a period of time and a driving preference specified by the user,
   wherein when the first route is affected by travel condition information, a second route is suggested along with an estimated travel time to the destination using the second route.

21. The system of claim 20, wherein providing the route guidance comprises:
   receiving the travel condition information, and
   applying the travel condition information to the first route or to the second route.

22. The system of claim 20, wherein the travel condition information is received from one or more feeds, each of the feeds being one of real time, forecast and delay.

23. The system of claim 20, wherein the travel condition information comprises one or more of a weather condition, a traffic condition and an event.

24. The system of claim 20, wherein when the travel condition information affects the first route or the second route beyond a threshold, an alert is generated.

25. The system of claim 20, further comprising receiving a desired arrival time at the destination location, wherein the desired arrival time is used to provide the route guidance.

26. The method of claim 1, wherein the second route is better than the first route based on the travel condition information.

27. The method of claim 1, wherein the second route is suggested based on the user travel profile and the travel condition information.

28. The method of claim 1, wherein the second route is suggested proactively.

29. The method of claim 1, wherein receiving the route request comprises inferring a route to the destination location from an ordered list of possible routes determined based on one or more of the user travel profile and a network profile.

30. The method of claim 29, wherein the network profile is a time-indexed profile indicating an expected travel time given a start time.

31. The method of claim 8, wherein the plan to perform the one or more tasks within the time constraint is provided by further using a network travel profile, wherein the network travel profile provides an expected travel time from one location to another location given a start time.

32. A method, comprising:
  receiving two or more tasks to be completed by a user, each of the two or more tasks to be completed at a different location; and
  providing route guidance to allow the user to complete the two or more tasks, the route guidance provided using a user travel profile and travel condition information.

33. The method of claim 32, wherein the user travel profile includes one or more of driving behaviors of the user tracked over a period of time and driving preference received from the user.

34. The method of claim 32, wherein the travel condition information includes one or more of traffic information, event information and weather information.

35. The method of claim 32, wherein providing the route guidance comprises ordering the two or more tasks to allow the user to complete the two or more tasks within a time constraint.

36. The method of claim 35, wherein the route guidance is provided to allow the two or more tasks to be completed at a lowest cost while still be within the time constraint.

37. The method of claim 32, where in the two or more tasks are provided from a personal information manager (PIM).

* * * * *

UNITED STATES PATENT AND TRADEMARK OFFICE
CERTIFICATE OF CORRECTION

PATENT NO. : 6,622,087 B2
DATED : September 16, 2003
INVENTOR(S) : Anderson et al.

It is certified that error appears in the above-identified patent and that said Letters Patent is hereby corrected as shown below:

<u>Title page,</u>
Item [12], after "Anderson", insert -- et al. --.
Item [75], Inventor, after "(US)", insert -- ; Nick D. Wade, Portland, OR (US); Steve Bennett, Hillsboro, OR (US); Paul R. Pierce, Portland, OR (US); Scott H. Robinson, Portland, OR (US); Uttam Kumar Sengupta, Portland, OR (US); Trevor Pering, Mountain View, CA (US); Shreekant Thakkar, Portland, OR (US); Kit Yoke Tham, Portland, OR (US); Lee Hirsch, Cupertino, CA (US) --.

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,622,087 B2 | |
| APPLICATION NO. | : 09/748813 | |
| DATED | : September 16, 2003 | |
| INVENTOR(S) | : Anderson | |

It is certified that error appears in the above-identified patent and that said Letters Patent is hereby corrected as shown below:

In column 2, at line 30 delete, "user s" and insert --user's--.

In column 3, at line 43 delete, "user s" and insert --user's--.

In column 11, at line 8 delete, ",route" and insert --route--.

Signed and Sealed this
Ninth Day of August, 2011

David J. Kappos
*Director of the United States Patent and Trademark Office*